US008158298B2

(12) United States Patent
Hasegawa

(10) Patent No.: US 8,158,298 B2
(45) Date of Patent: Apr. 17, 2012

(54) FUEL CELL SYSTEM

(75) Inventor: Masahiko Hasegawa, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 729 days.

(21) Appl. No.: 11/988,234

(22) PCT Filed: Jul. 25, 2006

(86) PCT No.: PCT/JP2006/314672
§ 371 (c)(1),
(2), (4) Date: Jan. 3, 2008

(87) PCT Pub. No.: WO2007/013453
PCT Pub. Date: Feb. 1, 2007

(65) Prior Publication Data
US 2009/0226783 A1 Sep. 10, 2009

(30) Foreign Application Priority Data
Jul. 27, 2005 (JP) ................................. 2005-217097

(51) Int. Cl.
H01M 8/04 (2006.01)

(52) U.S. Cl. ........ 429/446; 429/428; 429/430; 429/433; 429/443; 429/444; 429/415

(58) Field of Classification Search .................. 429/415, 429/428, 430, 433, 443, 444, 446
See application file for complete search history.

(56) References Cited

U.S. PATENT DOCUMENTS

2005/0026010 A1* 2/2005 Nonobe et al. .................. 429/17
2005/0130000 A1* 6/2005 Ojima et al. .................... 429/22

FOREIGN PATENT DOCUMENTS

| DE | 2683 02 902 T2 | 12/1996 |
| DE | 103 11 785 A1 | 9/2004 |
| JP | 07-235324 | 9/1995 |
| JP | 2002-246045 A | 8/2002 |

(Continued)

OTHER PUBLICATIONS

English Translation of JP 2002-246045, Aug. 30, 2002.*

(Continued)

Primary Examiner — Ula C Ruddock
Assistant Examiner — Frank Chernow
(74) Attorney, Agent, or Firm — Kenyon & Kenyon LLP

(57) ABSTRACT

The amount of moisture discharged from within a fuel cell is increased by a simple construction. The fuel cell system includes a fuel cell for generating electrical power after causing an anode to receive a hydrogen-containing anode gas and causing a cathode to receive an oxygen-containing cathode gas; an exhaust gas valve provided downstream of the fuel cell in a gas circulation system that supplies an anode gas to the fuel cell; a regulator that is provided upstream of the fuel cell in the gas circulation system and raises gas pressure in the gas circulation system; and an ECU that opens the exhaust gas valve, with the gas pressure kept raised to a level higher than in normal times by use of the regulator. As a result of this, it is possible to increase the gas flow rate and flow velocity within the fuel cell, and it becomes possible to increase the discharge amount of moisture stagnating within the fuel cell.

15 Claims, 5 Drawing Sheets

FOREIGN PATENT DOCUMENTS

| | | |
|---|---|---|
| JP | 2003-151588 A | 5/2003 |
| JP | 2003-173807 A | 6/2003 |
| JP | 2003-297402 A | 10/2003 |
| JP | 2003-317766 | 11/2003 |
| JP | 2004-342473 | 12/2004 |
| JP | 2005-190824 | 7/2005 |

OTHER PUBLICATIONS

English Translation of JP 2003-173807, Jun. 20, 2003.*
English Translation of JP 2003-297402, Oct. 17, 2003.*

* cited by examiner

FUEL CELL SYSTEM

This is a 371 national phase application of PCT/JP2006/314672 filed 25 Jul. 2006, claiming priority to Japanese Patent Applications No. 2005-217097 filed 27 Jul. 2005, the contents of which are incorporated herein by reference.

TECHNICAL FIELD

The present invention relates to a fuel cell system.

BACKGROUND ART

In a system that supplies anode gas (hydrogen gas) to a fuel cell, an anode circulation system that supplies anode off-gas discharged from the anode of the fuel cell back to the anode has hitherto been used. In such a system, Japanese Patent Laid-Open No. 2003-317766 discloses a technique for eliminating clogged drain by opening a purge valve when the clogged drain occurs within a fuel cell.

DISCLOSURE OF INVENTION

With the technique disclosed in Japanese Patent Laid-Open No. 2003-317766, however, in order to eliminate the clogged water in the fuel cell, it is necessary to newly add parts, such as an ejector, piping and the like to the system. This poses the problem that the manufacturing cost of the system increases.

The present invention has been made to solve problems as described above and the object of the invention is to increase the amount of moisture discharged from inside a fuel cell.

In accomplishing the above object, according to a first aspect of the present invention, there is provided a fuel cell system comprising: a fuel cell for generating electrical power after causing an anode to receive a hydrogen-containing anode gas and causing a cathode to receive an oxygen-containing cathode gas; a discharge valve provided downstream of the fuel cell in an anode system flow path that supplies and discharges the anode gas to and from the fuel cell; pressure raising means for raising gas pressure within the anode system flow path; and control means for operating the discharge valve and the pressure raising means so that the gas pressure is raised to a level higher than in normal times for at least part of a period when the discharge valve is open.

According to a second aspect of the present invention, there is provided the fuel cell system as described in the first aspect, wherein the control means opens the discharge valve, with the gas pressure kept raised by use of the pressure raising means.

According to a third aspect of the present invention, there is provided the fuel cell system as described in the first aspect, wherein the control means starts pressure raising by use of the pressure raising means at a point of time when the discharge valve is opened.

According to a fourth aspect of the present invention, there is provided the fuel cell system as described in the third aspect, wherein the control means gradually lowers a target value of pressure raising by use of the pressure raising means in the middle of opening the discharge valve.

According to a fifth aspect of the present invention, there is provided the fuel cell system as described in any one of the first to fourth aspects, wherein the anode system flow path includes an anode gas flow path that introduces an anode gas from an anode gas supply source to the anode and an anode off-gas flow path that discharges an anode off-gas from the anode, wherein the pressure raising means has a regulator that regulates a primary pressure of an anode gas within the anode gas flow path to a second pressure that is a target pressure, and temporarily makes the opening of the regulator larger than in normal times.

According to a sixth aspect of the present invention, there is provided the fuel cell system as described in the fifth aspect, further comprising: a pressure sensor for detecting the gas pressure of the anode gas flow path, wherein the pressure raising means adjusts the opening of the regulator so that the gas pressure in the anode gas flow path becomes a target value of pressure raising.

According to a seventh aspect of the present invention, there is provided the fuel cell system as described in the sixth aspect, wherein the anode system flow path is a gas circulation system, further comprising a circulation device for introducing an anode off-gas from the anode off-gas flow path to the anode gas flow path.

According to a eighth aspect of the present invention, there is provided the fuel cell system as described in the seventh aspect, further comprising: a gas-liquid separator for collecting moisture from a gas within the gas circulation system, wherein the discharge valve is connected to the gas-liquid separator, and has both a function of discharging moisture collected in the gas-liquid separator and a function of exhausting the gas within the gas circulation system.

According to a ninth aspect of the present invention, there is provided the fuel cell system as described in the seventh or eighth aspect, wherein the regulator is disposed upstream of a place where the anode off-gas is introduced in the anode gas flow path.

In accomplishing the above object, according to a tenth aspect of the present invention, there is provided a fuel cell system comprising: a fuel cell for generating electrical power after causing an anode to receive a hydrogen-containing anode gas and causing a cathode to receive an oxygen-containing cathode gas; a discharge valve provided downstream of the fuel cell in an anode system flow path that supplies and discharges the anode gas to and from the fuel cell; pressure raising device for raising gas pressure within the anode system flow path; and control device for operating the discharge valve and the pressure raising device so that the gas pressure is raised to a level higher than in normal times for at least part of a period when the discharge valve is open.

According to a eleventh aspect of the present invention, there is provided the fuel cell system as described in the tenth aspect, wherein the control device opens the discharge valve, with the gas pressure kept raised by use of the pressure raising device.

According to a twelfth aspect of the present invention, there is provided the fuel cell system as described in the tenth aspect, wherein the control device starts pressure raising by use of the pressure raising device at a point of time when the discharge valve is opened.

According to a thirteenth aspect of the present invention, there is provided the fuel cell system as described in any of the tenth to twelfth aspects, wherein the anode system flow path includes an anode gas flow path that introduces an anode gas from an anode gas supply source to the anode and an anode off-gas flow path that discharges an anode off-gas from the anode, wherein the pressure raising device has a regulator for regulating a primary pressure of an anode gas within the anode gas flow path to a second pressure that is a target pressure, and temporarily makes the opening of the regulator larger than in normal times.

According to the present invention, because the discharge valve is opened, with the gas pressure kept raised to a level higher than in normal times by use of the pressure raising means or at the same time with the start of pressure raising, it is possible to increase the gas flow rate and flow velocity within the fuel cell and it is possible to increase the discharge amount of moisture stagnating within the fuel cell. Therefore, it is possible to prevent the moisture within the fuel cell from stagnating. As a result of this, it is possible to prevent the power generation efficiency of the fuel cell from decreasing due to the stagnation of moisture. Also, because in a system in which an anode gas is supplied from a hydrogen tank, a variable regulator provided downstream of a hydrogen tank as pressure raising means can be used, it is possible to discharge the moisture within the fuel cell without adding new parts to the system.

According to the third aspect, in particular, because pressure raising is started by the pressure raising means at a point of time when the discharge valve is opened, the gas pressure is raised by the pressure raising means upstream of the fuel cell, whereas the gas pressure is lowered by opening the discharge valve downstream of the fuel cell and hence it is possible to increase the pressure difference at the inlet and the outlet of the fuel cell. Therefore, it is possible to increase the amount of moisture within the fuel cell to be discharged.

According to the fourth aspect, in particular, because a target value of pressure raising by use of the pressure raising means is gradually lowered in the middle of opening the discharge valve, it is possible to prevent an abrupt pressure change in the gas flow path from occurring. Therefore, it is possible to reduce the load to the fuel cell due to pressure raising, and it becomes possible to improve the reliability and durability of the fuel cell.

According to the eighth aspect, in particular, it is possible to perform both drainage from the gas circulation system and exhausting of gas from the gas circulation system by use of the discharge valve provided in the gas-air separator. Therefore, it is possible to reduce the number of parts that compose the system and the manufacturing cost can be substantially reduced.

Figure 1:
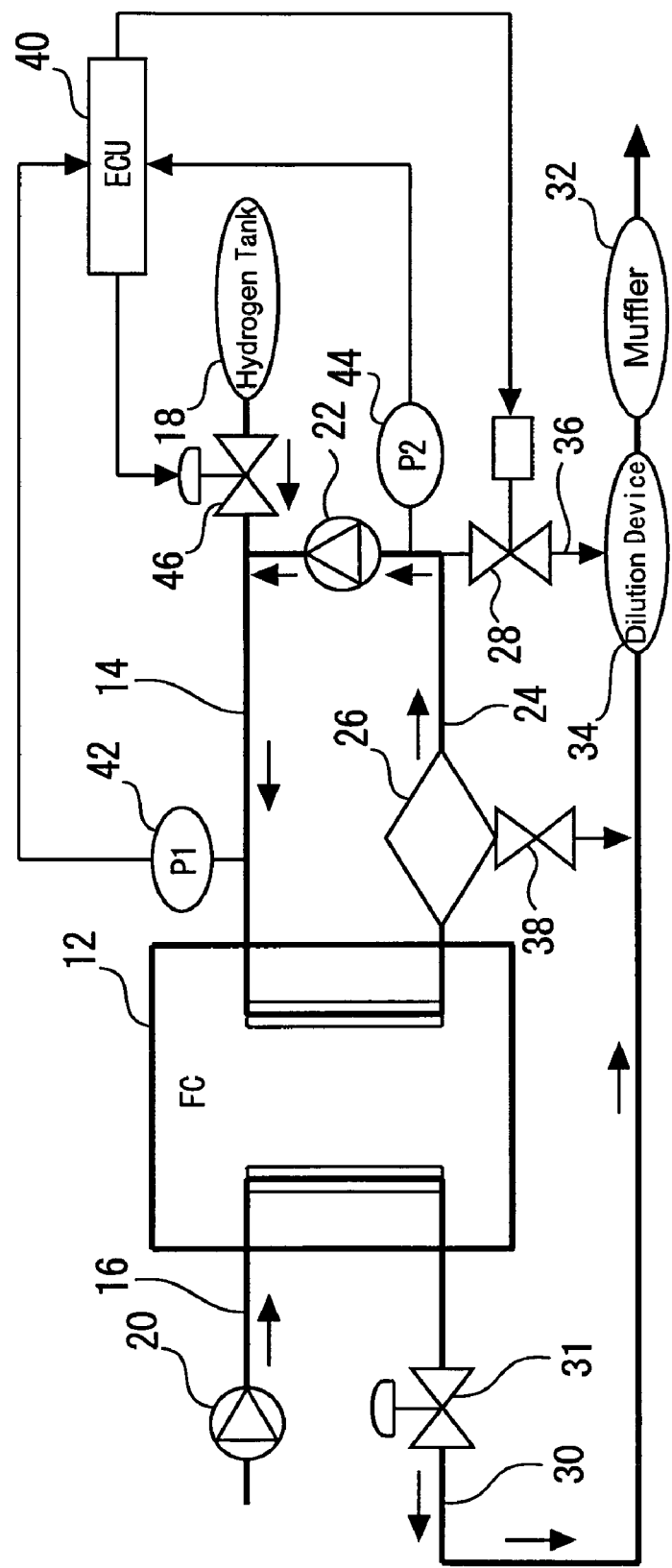
FIG. 1 is a schematic diagram showing the configuration of a fuel cell system related to the first embodiment of the present invention.

DESCRIPTION OF REFERENCE CHARACTERS 10 fuel cell system
12 fuel cell
14 anode gas flow path
24 anode off-gas flow path
26 gas-liquid separator
28 exhaust gas valve
40 ECU
46 regulator
48 exhaust gas/drain valve

BEST MODE FOR CARRYING OUT THE INVENTION

Some embodiments of the present invention will be described below on the basis of the drawings. Incidentally, like reference numerals refer to elements common to the drawings and overlapping explanations are omitted thereby. The present invention is not restricted by the following embodiments in any sense.

Embodiment 1

FIG. 1 is a schematic diagram showing the configuration of a fuel cell system 10 related to the first embodiment of the present invention. As shown in FIG. 1, an anode gas flow path 14 and a cathode gas flow path 16 are connected to a fuel cell (FC) 12. The anode gas flow path 14 is connected to a hydrogen tank 18 filled with high-pressure hydrogen gas, and a hydrogen-rich anode gas is fed from the hydrogen tank 18 to an anode. A pump 20 is provided in the cathode gas flow path 16, and a cathode gas containing oxygen as an oxidizing gas is fed to a cathode by the driving of the pump 20.

An anode off-gas discharged from the anode is fed to an anode off-gas flow path 24. A pump 22 is provided in the anode off-gas flow path 24 and the anode off-gas discharged from the anode is returned again to the anode gas flow path 14 by the driving of the pump 22. As a result of this, a circulation system is formed in an anode system flow path. The anode off-gas returned to the anode gas flow path 14 is again fed to the anode together with the hydrogen supplied from the hydrogen tank 18. This enables unreacted hydrogen contained in the anode off-gas to react within the fuel cell 12, thereby making it possible to raise the hydrogen utilization efficiency.

A gas-liquid separator 26 that collects moisture in the anode off-gas is provided in the anode off-gas flow path 24. A drain valve 38 is connected to the gas-liquid separator 26. The moisture in the anode off-gas collected in the gas-liquid separator 26 is discharged by opening the drain valve 38.

Downstream of the gas-liquid separator 26, an exhaust gas valve 28 is connected to the anode off-gas flow path 24. When large amounts of impurity components, such as nitrogen ($N_2$), are contained in the anode circulation system constituted by the anode off-gas flow path 24 the anode gas flow path 14→the fuel cell 12, purge is performed by intermittently opening the exhaust gas valve 28 and these components are discharged to a flow path 36.

Concretely, when impurity concentrations of the anode circulation system are detected or estimated and the impurity concentrations are higher than prescribed values, the exhaust gas valve 28 is intermittently opened and these impurities are discharged together with the anode off-gas. Thus, by intermittently opening the exhaust gas valve 28, the discharge of unreacted hydrogen in the anode off-gas can be minimized.

The output (voltage value, current value) of the fuel cell 12 decreases with increasing amounts of impurities, such as nitrogen, contained in the anode circulation system. Therefore, it is possible to adopt a method that involves monitoring the output of the fuel cell 12 and discharging impurities by opening the exhaust gas valve 28 when the output decreases to below a prescribed standard value.

On the other hand, the cathode off-gas discharged from the cathode flows through the cathode off-gas flow path 30 and is eventually discharged from a muffler 32. A control valve 31 that regulates the pressure in the cathode is provided in the cathode off-gas flow path 30. In the cathode off-gas flow path 30, a dilution device 34 is provided upstream of the muffler 32. The flow path 36 is connected to the dilution device 34, and the hydrogen in the anode off-gas discharged from the exhaust gas valve 28 together with impurities such as nitrogen is diluted by the dilution device 34 and discharged to the outside.

In the anode gas flow path 14, a regulator 46 is provided downstream of the hydrogen tank 18. The regulator 46 regulates the pressure of the anode gas at the inlet of the fuel cell 12 to a required appropriate value. The regulator 46 may be a solenoid valve which is driven at a high frequency and capable of continuously changing the time for which the valve is open, a solenoid valve (a variable orifice) capable of changing the opening area through which a gas in the gas flow path passes or a valve capable of changing the motion of a diaphragm.

A pressure sensor 42 is connected to the anode gas flow path 14 downstream of the regulator 14. Furthermore, a pressure sensor 44 is connected to the anode off-gas flow path 24 downstream of a connection to the exhaust gas valve 28. The pressure sensor 42 detects the pressure of the anode gas at the inlet of the fuel cell 12 (the inlet pressure P1), whereas the pressure sensor 44 detects the pressure of the anode off-gas at the outlet of the fuel cell 12 (the outlet pressure P2 (the primary pressure of the exhaust gas valve 28)).

As shown in FIG. 1, the system of the present invention is provided with an ECU (Electronic Control Unit) 40. To the ECU are connected various kinds of sensors (not shown) for detecting the output (voltage value, current value) of the fuel cell 12 and the like in addition to the above-described pressure sensors 42, 44 in order to grasp the operating condition of the system. Also, to the ECU 40 are connected the above-described regulator 46, drain valve 38, exhaust gas valve 28 and the like.

Although as described above water is generated in the cathode when electric power is generated by the fuel cell 12, part of the water generated in the cathode permeates to the anode side within the fuel cell 12. And when the water that has permeated the anode stagnates within the fuel cell 12, this stagnation may sometimes lower the power generation efficiency of the fuel cell 12.

For this reason, in this embodiment, in order to discharge the generated water that stagnates within the fuel cell 12, the gas flow rate and flow velocity of the anode circulation system are increased by opening the exhaust gas valve 28 in a prescribed case, whereby the generated water is discharged from within the fuel cell 12 to the anode off-gas flow path 24.

When the generated water stagnates within the fuel cell 12, this impedes the supply of the anode gas to an electrolyte membrane and, therefore, the output (voltage value, current value) of the fuel cell 12 decreases. Therefore, even when the exhaust gas valve 28 is opened in order to discharge the water within the fuel cell 12, it is possible to perform control on the basis of the output of the fuel cell 12. For example, when the output of the fuel cell 12 has become below a prescribed value, it is preferable to discharge the generated water that stagnates within the fuel cell 12 by opening the exhaust gas valve 28.

In discharging the generated water from within the fuel cell 12, by temporarily making the opening of the regulator 46 larger than in normal times in synchronization with the valve opening timing of the exhaust gas valve 28, the pressure of the anode gas fed to the fuel cell 12 is raised to a level higher than in normal times. As a result of this, the flow rate and flow velocity of the anode gas increase, making it possible to discharge the generated water within the fuel cell 12 in a short time. Therefore, it is possible to reduce a decrease in the power generation efficiency due to the moisture that stagnates within the fuel cell 12, and it is possible to improve the system efficiency and fuel consumption.

When the pressure of the anode gas is not raised, it is necessary to open the exhaust gas valve 28 for a long time in order to discharge the moisture within the fuel cell 12. According to the method of this embodiment, however, the flow rate and flow velocity of the anode gas can be increased by raising the pressure of the anode gas and, therefore, it is possible to minimize the time for which exhaust gas valve 28 is open when the generated water is discharged from within the fuel cell 12. Therefore, it is possible to minimize the amount of unreacted hydrogen in the anode off-gas discharged from the flow path 36 and a decrease in the system efficiency and fuel consumption can be reduced.

When purge has been performed without raising the pressure of the anode gas, it is necessary to exhaust the anode off-gas in a larger flow rate in order to discharge the moisture within the fuel cell 12 and, therefore, a large exhaust gas valve 28 suitable for the flow rate of the exhaust gas is necessary. In this embodiment, however, the flow velocity of the exhaust gas can be increased by raising the pressure of the anode gas and, therefore, it is possible to ensure a desired flow rate of exhaust gas even in the case of the miniaturization of the exhaust gas valve 28. Therefore, compared to the case where the pressure of the anode off-gas is not raised, it is possible to miniaturize the exhaust gas valve 28 and it is possible to reduce the mounting space of the exhaust gas valve 28 and to reduce the costs of parts.

The pressure of the anode gas is raised by the regulator 46 only when the generated water is discharged from within the fuel cell 12. Therefore, the high-pressure anode gas is not constantly fed to the fuel cell 12 and it is possible to reduce a decrease in the reliability and endurance of the fuel cell 12.

Because the pressure raising of the anode gas is performed by using the regulator 46 that is usually provided in the fuel cell system 10, it is unnecessary to add new parts for pressure raising. Therefore, a system that discharges the moisture within the fuel cell 12 can be built without an increase in the manufacturing cost.

Figure 2A:
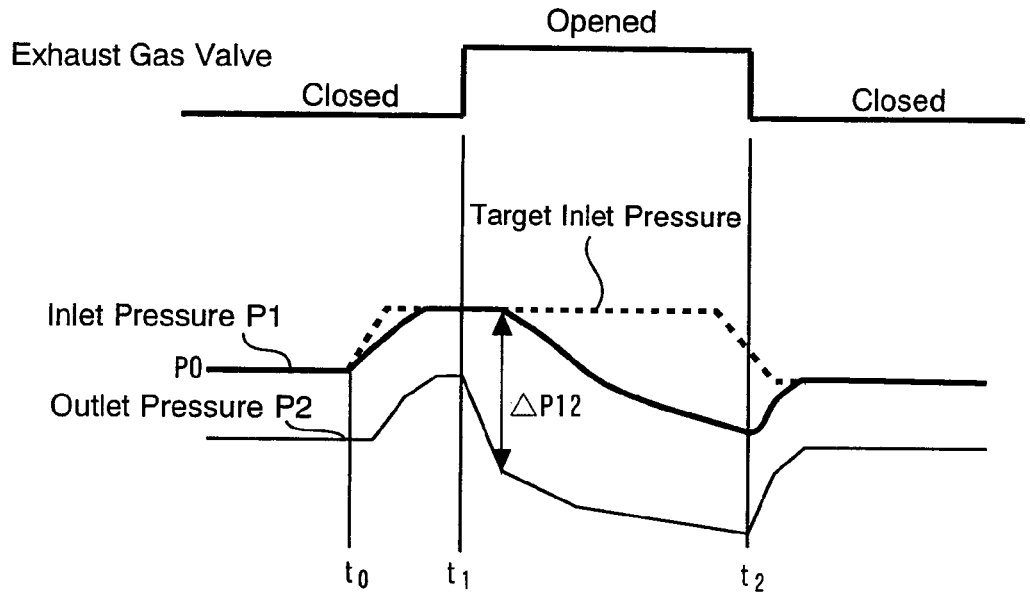
FIGS. 2(A) and 2(B) are timing charts showing the relationship between the valve opening timing of the exhaust gas valve and the inlet pressure P1 and outlet pressure P2.
Figure 2B:
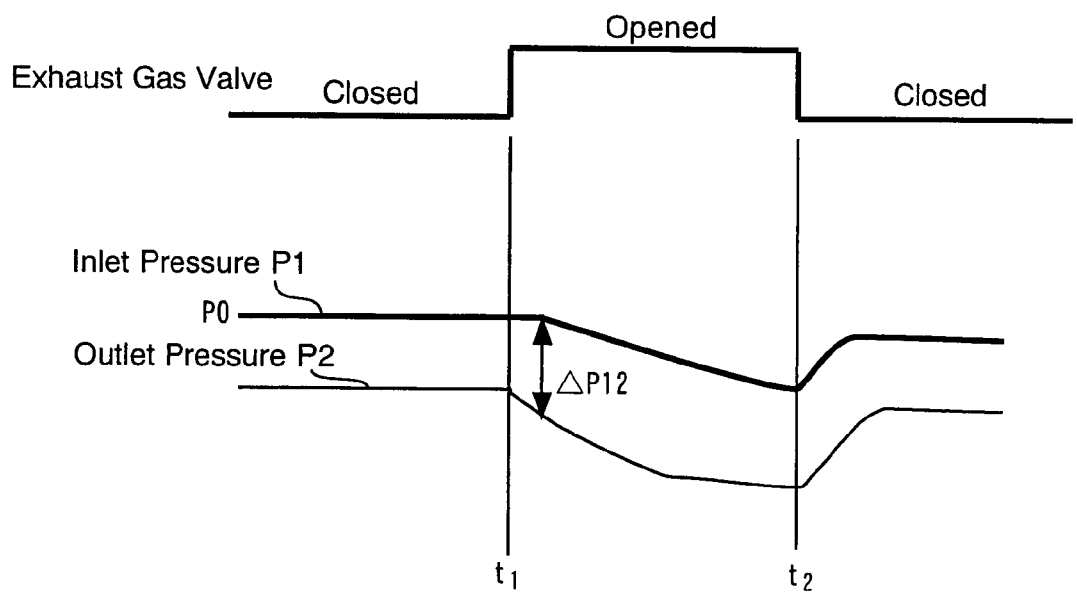

FIGS. 2(A) and 2(B) are timing charts showing the relationship between the valve opening timing of the exhaust gas valve 28 and the inlet pressure P1 and outlet pressure P2 detected by the pressure sensors 42, 44. FIG. 2(A) shows a case where the pressure of the anode gas is raised in accordance with the opening timing of the exhaust gas valve 28 by the method of this embodiment. For a comparison, FIG. 2(B) shows a case where the pressure of the anode gas is not raised when the exhaust gas valve 28 is opened, but the pressure in normal times is maintained.

In FIGS. 2(A) and 2(B), the inlet pressure P1 and the outlet pressure P2 are indicated by solid lines. In this embodiment, the opening of the regulator 46 is adjusted on the basis of a target value of the inlet pressure P1 (target inlet pressure) and in FIG. 2(A), the target inlet pressure is indicated by a broken line along with the inlet pressure P1. As shown in FIGS. 2(A) and 2(B), because pressure losses occur within the fuel cell 12, the outlet pressure P2 becomes lower than the inlet pressure P1.

As shown in FIGS. 2(A) and 2(B), during a normal operation the target inlet pressure is set at P0 and the inlet pressure P1 is controlled to the pressure P0. The target inlet pressure is determined according to the operating conditions of the system, such as the output of the fuel cell 12 and the temperature of the fuel cell 12, and is regulated to the fixed value P0 except at the valve opening of the exhaust gas valve 28. More particularly, the pressure P0 is adjusted to a lower pressure in such a range that operation of the fuel cell 12 is fully possible. This enables the load to the fuel cell 12 by the pressure of the anode gas to be reduced, and it is possible to suppress the cross leak of hydrogen gas within the fuel cell 12 and to improve the endurance and reliability of an electrolyte membrane within the fuel cell 12.

As shown in FIGS. 2(A) and 2(B), the exhaust gas valve 28 is opened at a time t1 in order to discharge the generated water within the fuel cell 12 and closed at a time t2. In the method of this embodiment shown in FIG. 2(A), the target inlet pressure is raised to a value larger than P0 at a time t0 earlier than the time t1 when the exhaust gas valve 28 is opened. As a result of this, the opening of the regulator 46 is temporally set to be larger that normal at time t0, and from the time t0 and beyond, both the inlet pressure P1 and the outlet pressure P2 increase. And eventually the inlet pressure P1 reaches the target inlet pressure, which has been raised.

After the inlet pressure P1 reaches the target inlet pressure, the exhaust gas valve 28 is opened at the time t1. On this occasion, on the inlet side of the fuel cell 12, the set pressure of the regulator 46 is set at a level higher than in normal times. Furthermore, pressure losses occur within the fuel cell 12 and the inside of the fuel cell 12 is a buffer space and provides resistance during passage of the gas. Therefore, immediately after the exhaust gas valve 28 is opened at the time t1, the raised inlet pressure P1 does not at once decrease and the state that the inlet pressure P1 is raised continues.

On the other hand, because at the outlet of the fuel cell 12, the anode off-gas flow path 24 is opened to the atmosphere side by opening the exhaust gas valve 28, the differential pressure at the inlet and outlet of the exhaust gas valve 28 increases and the flow rate of the discharged anode off-gas increases. As a result of this, the pressure within the anode off-gas flow path 24 decreases abruptly.

Therefore, immediately after the opening of the exhaust gas valve 28 at the time t1, the decrease ratio of the outlet pressure P2 becomes higher than the decrease ratio of the inlet pressure P1. For this reason, the differential pressure ΔP12 between the inlet pressure P1 and the outlet pressure P2 increases and it becomes possible to increase the flow rate and flow velocity within the fuel cell 12. As a result of this, when the generated water stagnates in the anode gas flow path within the fuel cell 12, it is possible to instantaneously discharge the generated water to the anode off-gas flow path 24 owing to a gas flow at an increased flow rate and flow velocity. This enables a decrease in the power generation efficiency caused by the stagnation of the generated water within the fuel cell 12 to be positively reduced.

When the exhaust gas valve 28 is closed at the time t2, the target inlet pressure is set at P0 and the opening of the regulator 46 is returned to a condition in normal times. And from the time t2 and beyond, the inlet pressure P1 is controlled to the pressure P0.

In a fuel cell system, it is desirable to lower the pressure of hydrogen gas supplied to inside the fuel cell as far as possible in order to improve the gas utilization efficiency by lowering the cross leak due to an electrolyte membrane or in order to improve the endurance and reliability of a membrane within a fuel cell stack. However, when the gas pressure is lowered, the differential pressure between the anode gas pressure and the atmosphere pressure decreases and the discharge flow rate decreases when a discharge valve is opened. For this reason, the differential pressure between the inlet and outlet of the fuel cell decreases and the moisture becomes apt to stagnate within the fuel cell, thereby posing the problem that the water dischargeability from the fuel cell decreases. Therefore, it is difficult to simultaneously achieve an improvement in the efficiency, endurance and reliability of the fuel cell and an improvement in water dischargeability.

In order to solve such problems, because the method of this embodiment, the pressure of the anode gas is raised only when the moisture within the fuel cell 12 is discharged, in normal times, it is possible to operate the system, with the anode gas pressure kept lowered. Therefore, it is unnecessary to set the anode gas pressure in normal times at a somewhat high level in order to improve the water dischargeability from the fuel cell 12 and it is possible to suppress the occurrence of the cross leak within the fuel cell 12 and it is possible to raise the efficiency of the system. Furthermore, by lowering the anode gas pressure in normal times, it is possible to reduce the differential pressure between the anode and cathode of the fuel cell 12 and the differential pressure between the anode and the atmospheric pressure, and it is possible to improve the reliability and endurance of the fuel cell 12.

On the other hand, for the characteristics of FIG. 2(B), because the target inlet pressure is constantly kept at the fixed value P0 and the inlet pressure P1 is not raised during the opening of the exhaust gas valve 28, the flow velocity from the exhaust gas valve 28 is low. Therefore, the inlet pressure P1 and the outlet pressure P2 decrease in synchronization with the opening of the exhaust gas valve 28 and the decrease ratio of the inlet pressure P1 and the decrease ratio of the outlet pressure P2 from the time t1 and beyond become on the same order. Therefore, the differential pressure Δ12 between the inlet pressure P1 and the outlet pressure P2 is small compared to the case of FIG. 2(A). For this reason, the gas flow rate and flow velocity within the fuel cell 12 are lower than in the case of FIG. 2(A) and it is impossible to positively discharge the generated water that stagnates within the fuel cell 12.

Therefore, according to this embodiment, by raising the inlet pressure P1 in opening the exhaust gas valve 28, it becomes possible to positively discharge the generated water that stagnates within the fuel cell 12 and a decrease in the power generation efficiency can be positively reduced.

Figure 3A:
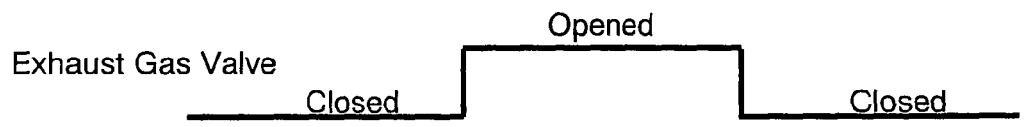
FIGS. 3(A) to 3(C) are timing charts showing an example in which the target pressure is set by a method different from the methods shown in FIGS. 2(A) and 2(B).
Figure 3B:
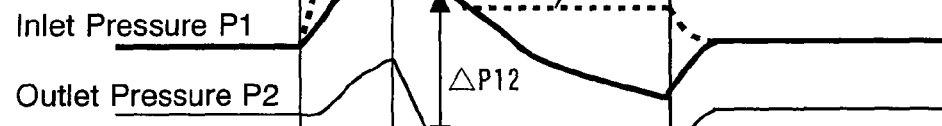
Figure 3C:

FIGS. 3(A) to 3(C) are timing charts showing an example in which the target pressure is set by a method different from the methods shown in FIGS. 2(A) and 2(B). In FIG. 3(A), the pressure raising of the inlet pressure P1 until the time t1 is performed in the same way as in FIG. 2(A), the target inlet pressure is lowered to a prescribed value higher than P0 after a lapse of a prescribed time T from the time t1, and the target inlet pressure is returned to P0 at the time t2, whereby the target inlet pressure is decreased by two steps at the time t1 and beyond. As described above, because the outlet pressure P2 decreases in synchronization with the opening of the exhaust gas valve 28 and the gas flow rate and gas velocity within the fuel cell 12 reach a maximum immediately after the opening of the exhaust gas valve 28, even in the case where the target inlet pressure is lowered after a lapse of the prescribed time T from the time t1, it is possible to discharge the water from the fuel cell 12 during the prescribed time T. Also, due to the opening of the exhaust gas valve 28, the inlet pressure P1 and the outlet pressure P2 decrease inevitably as time passes and, therefore, no problem occurs if the target inlet pressure is lowered. Therefore, according to the method of the FIG. 3(A), by lowering the target inlet pressure in a short time after the opening of the exhaust gas valve 28, it is possible to minimize the time for which the gas pressure within the fuel cell 12 is raised, the occurrence of the cross leak can be suppressed, and it becomes possible to improve the reliability and endurance of the fuel cell 12. Furthermore, because the target inlet pressure is changed by two stages, the pressure change after the opening of the exhaust gas valve 28 becomes slow and it is possible to reduce a rapid pressure change in the fuel cell 12. Therefore, it is possible to suppress the generation of a mechanical load to the fuel cell 12 ascribed to a pressure change.

In FIG. 3(B), the target inlet pressure is gradually raised at a prescribed ratio during pressure raising so that the inlet pressure P1 and the outlet pressure P2 reach a maximum at the time t1 when the exhaust gas valve 28 is opened. The target inlet pressure is gradually lowered from the time t1 and beyond, and the target inlet pressure is returned to P0 in the vicinity of the time t2 when the exhaust gas valve 28 is closed. In this case, because no abrupt pressure change occurs during pressure raising, it is possible to reduce a mechanical load to the fuel cell 12 and it is possible to set the peak value of the target inlet pressure at a higher level. This enables the flow rate of the initial exhaust gas immediately after the opening of the exhaust gas valve 18 to be increased and the pressure drop of the outlet pressure P2 to be further increased. Therefore, because the differential pressure $\Delta P12$ becomes greater and the gas flow rate and flow velocity within the fuel cell 12 can be increased, it is possible to positively discharge the moisture that stagnates within the fuel cell 12 in a short time. Because the target inlet pressure is gradually lowered from the time t1 and beyond, it is possible to minimize the pressure raising of the gas within the fuel cell 12 during the opening of the exhaust gas valve 28. Therefore, it is possible to suppress the occurrence of the cross leak and it is possible to raise the reliability and endurance of the fuel cell 12. Furthermore, as with the case of FIG. 3(A), because the pressure change after the opening of the exhaust gas valve 28 can be made slow, it is possible to reduce an abrupt pressure change in the fuel cell 12 and it is possible to prevent the generation of a mechanical load to the fuel cell 12 ascribed to a pressure change.

In FIG. 3(C), the target inlet pressure is raised at the time t1 when the exhaust gas valve 28 is opened. As a result of this, the inlet pressure P1 increases from the time t1 and beyond and the outlet pressure P2 decreases due to the gas exhausting from the exhaust gas valve 28. Therefore, it is possible to increase the differential pressure $\Delta P12$ between the inlet pressure P1 and the outlet pressure P2 and it is possible to increase the gas flow rate and flow velocity within the fuel cell 12. As a result of this, it becomes possible to positively discharge the generated water that stagnates within the fuel cell 12.

As described above, according to Embodiment 1, the pressure of the anode gas is raised by adjusting the opening of the regulator 46 in opening the exhaust gas valve 28, it is possible to increase the differential pressure $\Delta 12$ between the inlet pressure P1 and the outlet pressure P2. Therefore, it is possible to increase the flow rate and flow velocity of the anode gas within the fuel cell 12 and it becomes possible to positively discharge the moisture that stagnates within the fuel cell 12. As a result of this, it is possible to prevent the power generation efficiency from decreasing due to the stagnation of the generated water within the fuel cell 12.

Incidentally, in Embodiment 1 described above, the present invention is carried out in a gas circulation system that circulates the anode off-gas again to the anode in order to raise the hydrogen utilization efficiency. However, the fuel cell system to be used is not limited to this. That is, the present invention may also be carried out by opening and closing a discharge valve provided in an anode off-gas flow path in a dead end type fuel cell system.

Embodiment 2

Figure 4:
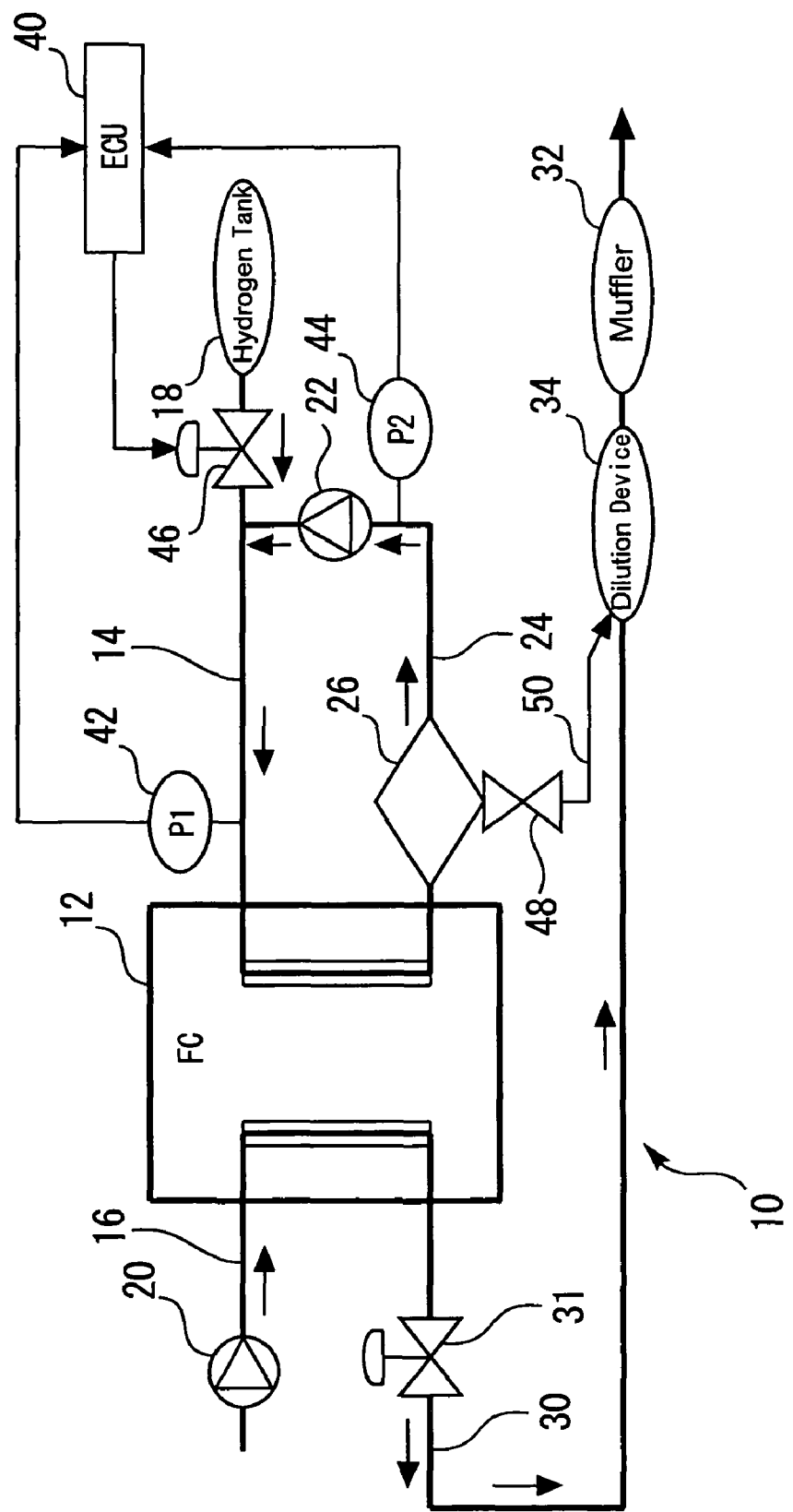
FIG. 4 is a schematic diagram showing the configuration of a fuel cell system related to the second Embodiment of the present invention.

Next, Embodiment 2 of the present invention will be described. FIG. 4 is a schematic diagram showing the configuration of a fuel cell system 10 related to Embodiment 2. As shown in FIG. 4, in the system of Embodiment 2, an exhaust gas/drain valve 48 is connected to a gas-liquid separator 26. The exhaust gas/drain valve 48 is connected to a dilution device 34 via flow path 50. The exhaust gas/drain valve 48 has a function of discharging both moisture and impurity gases, such as nitrogen, from within an anode circulation system. Therefore, in the system of FIG. 4, the exhaust gas valve 28 in FIG. 1 is not provided. Other components of the system of Embodiment 2 are the same as in Embodiment 1.

In Embodiment 2, when large amounts of impurity components such as nitrogen ($N_2$) and water ($H_2O$) are contained in the anode circulation system, these components are discharged to the flow path 50 by intermittently opening the exhaust gas/drain valve 48. In discharging the nitrogen and water of the anode circulation system, in the same way as in Embodiment 1, the exhaust gas/drain valve 48 is opened in order to avoid that impurity concentrations of the anode circulation system become not less than prescribed values or in order to avoid that the output of a fuel cell 12 becomes lower than a prescribed standard value. When the exhaust gas/drain valve 48 is opened, the moisture collected in the gas-liquid separator 26 is first discharged to the flow path 50 and the anode off-gas within an anode off-gas flow path 24 is then discharged to the anode off-gas flow path 50. The anode off-gas discharged to the flow path 50 is diluted in the dilution device 34 in the same way as in Embodiment 1 and fed to a muffler 32.

As described above, in Embodiment 2, the exhaust gas/drain valve 48 has the function of discharging both the moisture and impurity gases in the anode off-gas. Therefore, it is possible to discharge both the moisture and impurity gases contained in the anode off-gas simply by providing one exhaust gas/drain valve 48. Therefore, it is possible to minimize the number of parts that compose the system and it becomes possible to reduce the manufacturing cost.

Also in Embodiment 2, in discharging the moisture that stagnates within the fuel cell 12, the exhaust gas/drain valve 48 is opened, with the gas pressure within the anode circulation system kept raised by the control through the use of a regulator 46. As a result of this, due to the differential pressure $\Delta P12$ between the inlet pressure P1 and the outlet pressure P2, it is possible to discharge the moisture that stagnates within the fuel cell to the anode off-gas flow path 24. As with Embodiment 1, a judgment as to whether or not moisture stagnates within the fuel 12 can be made on the basis of the output of the fuel cell 12.

Figure 5:
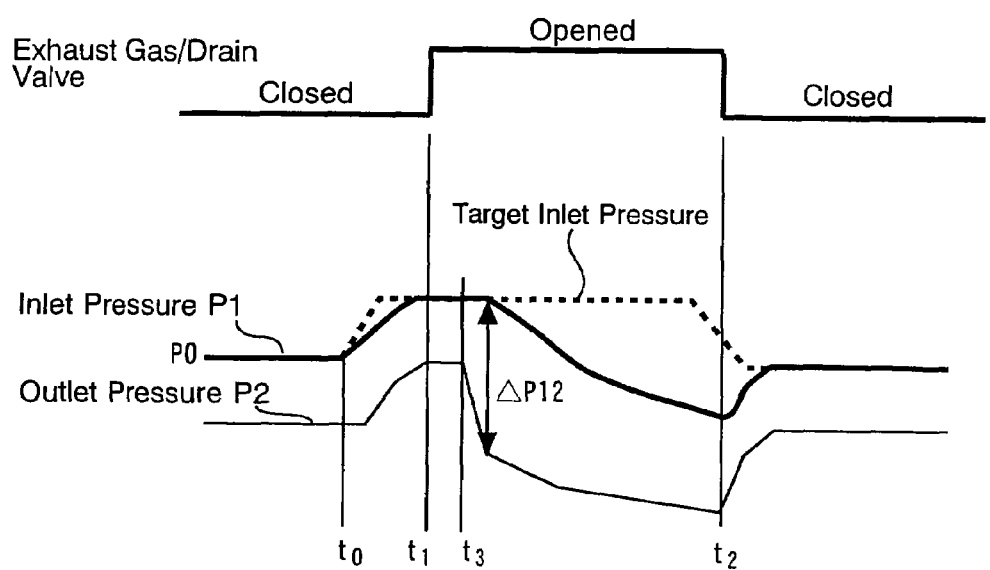
FIG. 5 is a timing chart showing the relationship between the valve opening timing of the exhaust gas/drain valve and pressure values detected by the pressure sensors.

FIG. 5 is a timing chart showing the relationship between the valve opening timing of the exhaust gas/drain valve 48 and pressure values detected by the pressure sensors 42, 44. In the same way as with Embodiment 1, the target inlet pressure is raised at the time t0. And after the inlet pressure P1 reaches the target inlet pressure, which has been raised, that is, after the pressure raising of the anode off-gas is completed, the exhaust gas/drain valve 48 is opened at the time t1.

When the exhaust gas/drain valve 48 is opened, the moisture collected in the gas-liquid separator 26 is first discharged to the flow path 50. And when the discharge of the moisture collected in the gas-liquid separator 26 is completed, the anode off-gas is subsequently discharged from the exhaust gas/drain valve 48 to the flow path 50.

In FIG. 5, a time t3 indicates the time when the discharge of the moisture from the gas-liquid separator 26 is completed. Thus, because for a duration from the time t1 to the time t3, the moisture in the gas-liquid separator 26 is being discharged to the flow path 50 and no gas is discharged from the anode circulation system, the values of the inlet pressure P1 and the outlet pressure P2 do not change from the pressure-raised state. Because after the time t3 the anode off-gas is discharged to the flow path 50, the inlet pressure P1 and the outlet pressure P2 change. That is, it follows that in Embodiment 2 the anode off-gas is discharged from the time t3 and beyond. When attention is paid to the time at which the anode off-gas is discharged, the time t3 of Embodiment 2 corresponds to the time t1 of Embodiment 1.

Because at the time t3, the inlet pressure P1 has been raised and the outlet pressure P2 decreases due to the gas exhausting from the exhaust gas/drain valve 48, the differential pressure ΔP12 between the inlet pressure P1 and the outlet pressure P2 increases for the same reason as in Embodiment 1. Therefore, in the same way as with Embodiment 1, it is possible to raise the gas flow rate and flow velocity within the fuel cell 12 and it is possible to discharge the moisture that stagnates within the fuel cell to the anode off-gas flow path 24. As a result of this, it is possible to positively reduce the decrease in the power generation efficiency of the fuel cell 12 ascribed to the stagnation of the generated water.

Incidentally, because the outlet pressure P2 decreases from the time t3 and beyond, it is possible to make a judgment as to whether or not the time t3 has arrived on the basis of the outlet pressure P2. Therefore, when control for closing the exhaust gas/drain valve 48 is performed after a lapse of a prescribed time after the time t3, it is preferable to judge the arrival of the time t3 on the basis of the outlet pressure P2. Because the gas pressure in the flow path 50 increases abruptly when gas exhausting to the flow path 50 is performed at the time t3, it is possible to adopt a method that involves providing a sensor that detects the gas pressure in the flow path 50 and judging the arrival of the time t3 on the basis of detected values of this sensor.

Also in Embodiment 2, in the same way as with FIG. 3 of Embodiment 1, it is possible to make the control of the target inlet pressure variable. On this occasion, as described above, the time t3 of Embodiment 2 corresponds to the time t1 of Embodiment 1. Therefore, when the target inlet pressure is controlled as shown in FIG. 3(A), for example, it is necessary only that the target inlet pressure be lowered after a prescribed time T elapses after the time t3. When the control of FIG. 3(B) is performed, the control is performed so that the target inlet pressure reaches a peak value at the time t3. When the control of FIG. 3(C) is performed, it is preferable to increase the target inlet pressure at the time t3 and beyond.

As described above, according to Embodiment 2, because in the system provided with the exhaust gas/drain valve 48 having the function of discharging both the moisture and impurity gases, the pressure of the anode gas is raised by adjusting the opening of the regulator 46 in opening the exhaust gas/drain valve 48, it is possible to increase the differential pressure ΔP12 between the inlet pressure P1 and the outlet pressure P2 of the fuel cell 12. Therefore, it is possible to increase the flow rate and flow velocity of the anode gas within the fuel cell 12 and it becomes possible to positively discharge the moisture that stagnates within the fuel cell 12. As a result of this, it is possible to prevent the power generation efficiency from decreasing due to the stagnation of the generated water within the fuel cell 12.

Others

Incidentally, the problem can also be solved in the following aspect of the present invention.

A fuel cell system comprising:

a fuel cell for generating electrical power after causing an anode to receive a hydrogen-containing anode gas and causing a cathode to receive an oxygen-containing cathode gas;

a discharge valve provided downstream of the fuel cell in a gas circulation system that supplies the anode gas to the fuel cell;

pressure raising means that is provided upstream of the fuel cell and raises gas pressure within the gas circulation system; and control means for opening the discharge valve by raising the gas pressure to a level higher than in normal times by use of the pressure raising means.

The invention claimed is:

1. A fuel cell system, comprising:
a fuel cell for generating electrical power after causing an anode to receive a hydrogen-containing anode gas and causing a cathode to receive an oxygen-containing cathode gas;
a discharge valve provided downstream of the fuel cell in an anode system flow path that supplies and discharges the anode gas to and from the fuel cell;
a pressure raising device for raising gas pressure within the anode system flow path; and
a control device programmed to operate the discharge valve and the pressure raising device so as to increase the gas pressure for at least part of a period when the discharge valve is open in exhaust gas treatment that involves detecting or estimating an impurity concentration within the anode system flow path and opening the discharge valve when the impurity concentration reaches a prescribed value for a prescribed period,
wherein the control device is further programmed to operate the pressure raising device so as to increase a pressure upstream of the fuel cell anode to a first target pressure prior to opening the discharge valve, and to operate the pressure raising device so as to decrease the pressure upstream of the fuel cell anode to a second target pressure, which is lower than the first target pressure, a predetermined time after opening the discharge valve and prior to closing the discharge valve,
wherein the increasing the pressure upstream of the fuel cell anode to the first target pressure increases a pressure differential between upstream and downstream of the fuel cell anode, and
wherein the predetermined time is closer to the opening of the discharge valve than to the closing of the discharge valve.

2. The fuel cell system according to claim 1, wherein the control device opens the discharge valve, with the gas pressure kept raised by use of the pressure raising device.

3. The fuel cell system according to claim 1, wherein the control device starts pressure raising by use of the pressure raising device at a point of time when the discharge valve is opened.

4. The fuel cell system according to claim 1, wherein the control device gradually lowers a target value of pressure raising by use of the pressure raising device in the middle of opening the discharge valve.

5. The fuel cell system according to claim 1, wherein the anode system flow path includes an anode gas flow path that introduces an anode gas from an anode gas supply source to the anode and an anode off-gas flow path that discharges an anode off-gas from the anode,
wherein the pressure raising device has a regulator that regulates a primary pressure of an anode gas within the anode gas flow path to a second pressure that is a target pressure, and temporarily increases the opening of the regulator.

6. The fuel cell system according to claim 5, further comprising:
- a pressure sensor for detecting the gas pressure of the anode gas flow path,
- wherein the pressure raising device adjusts the opening of the regulator so that the gas pressure in the anode gas flow path becomes a target value of pressure raising.

7. The fuel cell system according to claim 5, wherein the anode system flow path is a gas circulation system, further comprising a circulation device for introducing an anode off-gas from the anode off-gas flow path to the anode gas flow path.

8. The fuel cell system according to claim 7, further comprising:
- a gas-liquid separator for collecting moisture from a gas within the gas circulation system,
- wherein the discharge valve is connected to the gas-liquid separator, and has both a function of discharging moisture collected in the gas-liquid separator and a function of exhausting the gas within the gas circulation system.

9. The fuel cell system according to claim 7, wherein the regulator is disposed upstream of a place where the anode off-gas is introduced in the anode gas flow path.

10. A fuel cell system, comprising:
- a fuel cell for generating electrical power after causing an anode to receive a hydrogen-containing anode gas and causing a cathode to receive an oxygen-containing cathode gas;
- a discharge valve provided downstream of the fuel cell in an anode system flow path that supplies and discharges the anode gas to and from the fuel cell;
- a pressure raising device for raising gas pressure within the anode system flow path; and
- a control device programmed to operate the discharge valve and the pressure raising device so as to increase the gas pressure for at least part of a period when the discharge valve is open,
- wherein the control device is further programmed to operate the pressure raising device so as to increase a pressure upstream of the fuel cell anode to a first target pressure prior to opening the discharge valve, and to operate the pressure raising device so as to decrease the pressure upstream of the fuel cell anode to a second target pressure, which is lower than the first target pressure, a predetermined time after opening the discharge valve and prior to closing the discharge valve,
- wherein the increasing the pressure upstream of the fuel cell anode to the first target pressure increases a pressure differential between upstream and downstream of the fuel cell anode, and
- wherein the predetermined time is closer to the opening of the discharge valve than to the closing of the discharge valve.

11. The fuel cell system according to claim 10, wherein the control device opens the discharge valve, with the gas pressure kept raised by use of the pressure raising device.

12. The fuel cell system according to claim 10, wherein the control device starts pressure raising by use of the pressure raising device at a point of time when the discharge valve is opened.

13. The fuel cell system according to claim 10, wherein the anode system flow path includes an anode gas flow path that introduces an anode gas from an anode gas supply source to the anode and an anode off-gas flow path that discharges an anode off-gas from the anode,
- wherein the pressure raising device has a regulator for regulating a primary pressure of an anode gas within the anode gas flow path to a second pressure that is a target pressure, and temporarily increases the opening of the regulator.

14. The fuel cell system according to claim 1, wherein the discharge valve includes an exhaust gas valve that mainly exhausts gas and a drain valve that mainly drains moisture,
- wherein the control means is further programmed to operate the exhaust gas valve and the pressure raising means so as to increase the gas pressure for at least part of a period when the exhaust gas valve is open.

15. A fuel cell system, comprising:
- a fuel cell for generating electrical power after causing an anode to receive a hydrogen-containing anode gas and causing a cathode to receive an oxygen-containing cathode gas;
- a discharge valve provided downstream of the fuel cell in an anode-dedicated flow path that supplies and discharges the anode gas to and from the fuel cell;
- pressure raising means for raising gas pressure within the anode system flow path by use of a regulator that is drivable with a high frequency; and
- control means programmed to operate the discharge valve and the pressure raising means so as to increase the gas pressure for at least part of a period when the discharge valve is open,
- wherein the control means is further programmed to operate the pressure raising means so as to increase a pressure upstream of the fuel cell anode to a first target pressure prior to opening the discharge valve, and to operate the pressure raising means so as to decrease the pressure upstream of the fuel cell anode to a second target pressure, which is lower than the first target pressure, a predetermined time after opening the discharge valve and prior to closing the discharge valve,
- wherein the increasing the pressure upstream of the fuel cell anode to the first target pressure increases a pressure differential between upstream and downstream of the fuel cell anode, and
- wherein the predetermined time is closer to the opening of the discharge valve than to the closing of the discharge valve.

* * * * *